(12) United States Patent
Booth et al.

(10) Patent No.: US 10,196,938 B2
(45) Date of Patent: Feb. 5, 2019

(54) CASING ASSEMBLY

(71) Applicant: ROLLS-ROYCE plc, London (GB)

(72) Inventors: Richard S Booth, Derby (GB); Mark J Knight, Derby (GB)

(73) Assignee: ROLLS-ROYCE plc, London (GB)

( * ) Notice: Subject to any disclaimer, the term of this patent is extended or adjusted under 35 U.S.C. 154(b) by 424 days.

(21) Appl. No.: 15/138,946

(22) Filed: Apr. 26, 2016

(65) Prior Publication Data

US 2017/0058699 A1  Mar. 2, 2017

(30) Foreign Application Priority Data

May 5, 2015 (GB) .................................. 1507647.4

(51) Int. Cl.
*F01D 25/26* (2006.01)
*F01D 25/24* (2006.01)
*F02C 3/04* (2006.01)
*F04D 29/52* (2006.01)

(52) U.S. Cl.
CPC .......... *F01D 25/26* (2013.01); *F01D 25/243* (2013.01); *F02C 3/04* (2013.01); *F04D 29/526* (2013.01); *F05D 2220/32* (2013.01)

(58) Field of Classification Search
CPC ........ F01D 25/26; F01D 25/28; F01D 25/243; F02C 3/04
USPC .......................................... 415/209.2, 210.1
See application file for complete search history.

(56) References Cited

U.S. PATENT DOCUMENTS

| 3,746,463 A | 7/1973 | Stock et al. |
| 4,716,721 A * | 1/1988 | Pask ......................... F02C 7/20 |
| | | 415/199.4 |
| 7,524,164 B2 * | 4/2009 | Wunderlich ............ F01D 11/18 |
| | | 415/136 |
| 2010/0242494 A1 | 9/2010 | Mulcaire |
| 2014/0341731 A1 * | 11/2014 | Scott ..................... F01D 11/003 |
| | | 415/214.1 |

FOREIGN PATENT DOCUMENTS

| GB | 191306077 A | 5/1913 |
| GB | 2114661 A | 8/1983 |
| GB | 2168755 A | 6/1986 |

OTHER PUBLICATIONS

Sep. 30, 2016 Search Report issued in European Patent Application No. 16166852.
Oct. 26, 2015 Search Report issued in British Application No. 1507647.4.

* cited by examiner

*Primary Examiner* — Timothy L Maust
(74) *Attorney, Agent, or Firm* — Oliff PLC

(57) ABSTRACT

The present invention provides a casing assembly for a gas turbine engine comprising a radially inner casing and a radially outer casing. The assembly further comprises an axial mounting arrangement for mounting the inner casing and outer casing in a fixed axial relationship. The axial mounting arrangement allows radial movement of the outer casing relative to the inner casing such that distortion of the inner casing as a result of engine carcass loads on the outer casing is obviated as the inner casing is radially isolated from the outer casing.

14 Claims, 4 Drawing Sheets

CASING ASSEMBLY

CROSS-REFERENCE TO RELATED APPLICATIONS

This application is based upon and claims the benefit of priority from British Patent Application Number 1507647.4 filed 5 May 2015, the entire contents of which are incorporated by reference.

BACKGROUND

1. Field of the Disclosure

The present disclosure relates to a casing assembly for a gas turbine engine. In particular, the present disclosure relates to a casing assembly for housing the high pressure compressor of a gas turbine engine.

2. Description of the Related Art

The present disclosure relates to a casing assembly for a gas turbine engine. In particular, the present disclosure relates to a casing assembly for housing the high pressure compressor of a gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, a combustor 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustor 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

A double skin casing comprising a radially inner and radially outer casing surrounding the high pressure compressor 14 and combustor 15 may be provided.

The outer casing is used to support the engine carcass loads and the bearing loads from the high pressure rotor. The inner casing needs to be isolated from these engine carcass loads. The engine carcass loads cause distortion in the outer casing and it is important to avoid such distortions in the inner casing to ensure that it remains concentric about the rotor to allow tight running clearances between the high pressure compressor blade tips and the inner casing.

The inner casing is typically radially supported at the fore (upstream) and aft (downstream) ends of the high pressure rotor. The axial loads on the casings (resulting from the difference between the forward loaded high pressure compressor and the rearward loaded combustor and high pressure turbine nozzle guide vane assembly) are reacted at diametrically opposed port and starboard supports at the fore end of the inner casing, the two supports each transmitting half of the axial load as the outer casing flexes in a vertical plane. The circumferential torque acting on the inner casing is reacted by cross keyed dogs towards the aft of the inner casing.

The double skin casing design has undesirable cost and weight implications because of the high amount of material needed to form the double casing along the length of the high pressure rotor. Furthermore, distortion of the inner casing may occur around a bleed offtake which may be located at the exit of the high pressure compressor and may comprise a floating duct which passes between the two casings and which is bolted to the inner casing. This distortion affects the concentricity and roundness of the inner casing about the high pressure rotor.

Furthermore, axial loads, which may be generated for example by a turbine active tip clearance control (ATCC) system (where present), can affect the concentricity of the inner casing about the high pressure rotor. Such an ATCC system cools the outer casing which radially chocks with the inner casing, forcing it radially inwards to close the high pressure turbine tip clearance. This radial chocking prevents axial sliding between the inner and outer casings. Where the inner and outer casing expand by differing amounts (e.g. during a transient), distortion of the inner casing can occur as a result of this radial chocking.

In an alternative design, a single skin casing is provided around the combustor with a double skin casing comprising a radially inner casing and a radially outer casing around the high pressure compressor. The inner casing is bolted to the outer casing via a full circumferential flange towards the aft of the inner casing, the flange acting as both a radial and axial support. The fore of the inner casing is supported radially within a sliding birdmouth joint.

This casing design has the advantage of reduced weight and avoids the radial chocking problem associated with the ATCC system. However, in this single/double skin casing design the inner casing is not sufficiently isolated from the engine carcass loads and significant distortions can occur thus undesirably affecting the concentricity of the inner casing around the high pressure rotor and the tip clearance for the high pressure compressor. Significant distortion can occur in this design as a result of a moment created around the thrust mount (which mounts the engine to the wing pylon) which is amplified during take-off. Furthermore, the bolted flange extending between the inner and outer casings results in radial forces arising from the mismatch between the thermal properties of the material forming the two casings. Finally, machining bolt-holes for connection of the flange to the outer casing is problematical.

OBJECTS AND SUMMARY

There is a desire for a casing assembly for a high pressure rotor in a gas turbine engine that minimises distortion of the inner casing surrounding the high pressure compressor whilst maintaining a low cost and low weight.

In a first aspect, there is provided a casing assembly for a gas turbine engine comprising:
   a radially inner casing;
   a radially outer casing; and
   an axial mounting arrangement for mounting the inner casing and outer casing in a fixed axial relationship wherein the axial mounting arrangement allows radial movement of the outer casing relative to the inner casing.

By providing an axial mounting arrangement which allows radial movement of the outer casing relative to the inner casing, distortion of the inner casing as a result of engine carcass loads on the outer casing is obviated as the inner casing is radially isolated from the outer casing.

Optional features of the invention will now be set out. These are applicable singly or in any combination with any aspect.

The casing assembly may be for a gas turbine engine having a compressor and a combustor. The radially inner casing may extend so as to surround the compressor but not the combustor.

The axial mounting arrangement may be one of more than one mounting arrangement that connects the radially inner casing and the radially outer casing. The axial mounting arrangement may be the most axially downstream mounting arrangement that connects the radially inner casing and the radially outer casing.

The casing assembly may comprise mounting arrangements for connecting the radially inner casing and the radially outer casing at two and only two axial positions.

In such an arrangement, the axial mounting arrangement may be provided at the more axially downstream position, and a radial mounting arrangement may be provided at the more axially upstream position. The radial mounting arrangement may be for mounting the inner casing and outer casing in a fixed radial relationship whilst allowing axial movement of the inner casing relative to the outer casing.

In some embodiments, the axial mounting arrangement may comprise a radially inwards-directed annular flange depending from (and at least partly circumscribing) the outer casing and a circumferential groove provided on (and at least partly circumscribing) said inner casing wherein the circumferential groove receives said annular flange and wherein the annular flange is radially slidable within said groove.

In these embodiments the radially inner end of the annular flange may be spaced from the radially inner end of the groove to ensure that there is no radial contact between the flange and the groove.

In other embodiments, the axial mounting arrangement may comprise a radially outwards-directed annular flange extending from (and at least partly circumscribing) the inner casing and a circumferential groove provided on (and at least partly circumscribing) said outer casing, wherein the circumferential groove receives said annular flange and wherein the annular flange is radially slidable within said groove.

In these embodiments the radially outer end of the annular flange may be spaced from the radially outer end of the groove to ensure that there is no radial contact between the flange and the groove.

These flange and groove arrangements reduce any effects of thermal incompatibility between the material of the casings and the need for the production of bolt holes is obviated.

In some embodiments, the annular flange is at least partially coated with a wear-resistant coating such as tungsten carbide cobalt. In some embodiments, the groove is at least partly lined with a wear-resistant coating such as tungsten carbide cobalt. In this way, wear of the contacting flange/groove surfaces is minimised as the flange slides within the groove.

In some embodiments, the annular groove is defined within a radially outwards-directed annular element on the inner casing or a radially inwards-directed annular element on the outer casing. The annular element may be defined by two annular plates extending/depending from the inner/outer casing. These annular plates may be axially spaced by a spacer portion.

In some embodiments, the inner casing comprises a plurality of struts extending radially outwards for supporting a respective annular plate. The struts may be angled e.g. equally and oppositely angled relative to the engine/rotor axis to form a triangular structure. A further strut (which may also be angled relative to the engine/rotor axis) may be provided to support the spacer portion.

In some embodiments, the outer casing has an axial extension portion which extends axially beyond the inner casing i.e. the downstream axial end of the inner casing is upstream of the downstream axial end of the outer casing. This axial extension portion may be used, for example to surround a combustor in a gas turbine engine thus reducing the overall weight of the casing compared to a double skin casing.

In some embodiments, the annular flange or groove is provided on the outer casing at a position where there is an axial plane where the outer casing is parallel to the engine/rotor axis during bending of the outer casing i.e. at a position where the distortion of the outer casing changes direction (has a zero gradient). This position can be determined using the Whole Engine Model (WEM), for example. This may help to ensure that the inner casing remains concentric with the rotor.

In some embodiments, for example where the outer casing has a greater axial extension than the inner casing and the position of zero bending on the outer casing is axially downstream of the downstream axial end of the inner casing (such that an optimally positioned flange/groove arrangement cannot be formed), the axial mounting arrangement may comprise a fixed connection (axially and radially fixed) between the inner and outer casing and a radially flexible link element axially fixed between the inner casing and outer casing.

This radially flexible link element flexes radially during movement of the outer casing relative to the inner casing i.e. it absorbs the radial deflection of the outer casing without transferring it to the inner casing.

In some embodiments, the flexible link element is mounted on/forms part of the inner casing. It may have, at or proximal its downstream axial end, an inner casing connection element (e.g. a radially-outwards extending flange) for forming the fixed connection with the outer casing.

In these embodiments, the outer casing may comprise an outer casing connection element (e.g. a radially inwards depending flange) for connection to the inner casing connection element.

In some embodiments, the casing assembly further comprises a radial mounting arrangement for mounting the inner casing and outer casing in a fixed radial relationship wherein the radial mounting arrangement allows axial movement of the inner casing relative to the outer casing.

In some embodiments, the radial mounting arrangement is provided at or proximal the upstream axial end of the inner casing.

In some embodiments, the radial mounting arrangement comprises a mounting surface provided on the inner casing for mounting on and sliding against a corresponding mounting surface depending from the outer casing.

In some embodiments, one or both of the mounting surfaces is/are coated with a wear-resistant coating such as tungsten carbide cobalt. In this way, wear of the mounting surface(s) is minimised.

In some embodiments, the radial mounting arrangement further comprises an anti-rotation mechanism for preventing rotational movement of the inner casing by the torque created by the aerodynamic loads in the gas turbine engine.

In a second aspect, there is provided a gas turbine engine comprising:
- a casing assembly according to the first aspect,
- a high pressure compressor; and
- a high pressure turbine;

wherein the radially inner casing and radially outer casing surrounds the high pressure compressor.

In some embodiments, the high pressure rotor, which may comprise the high pressure compressor and the high pressure turbine, extends between a front bearing and a rear bearing and the outer casing may comprise a front bearing support structure. The radially inner casing may not surround the high pressure turbine.

In some embodiments, the radial mounting arrangement fixes the inner casing to the front bearing support structure in a fixed radial relationship wherein the radial mounting arrangement allows axial movement of the inner casing relative to the front bearing support structure.

In some embodiments, the gas turbine engine further comprises a combustor and the axial extension of the outer casing surrounds the combustor. In these embodiments, the downstream axial end of the inner casing is upstream of the combustor. In this way, the inner casing surrounds only the high pressure compressor (and not the combustor) which reduces the weight/cost of the casing assembly.

BRIEF DESCRIPTION OF THE DRAWINGS

Embodiments will now be described by way of example with reference to the accompanying drawings in which.

DETAILED DESCRIPTION OF EMBODIMENTS

Figure 1:
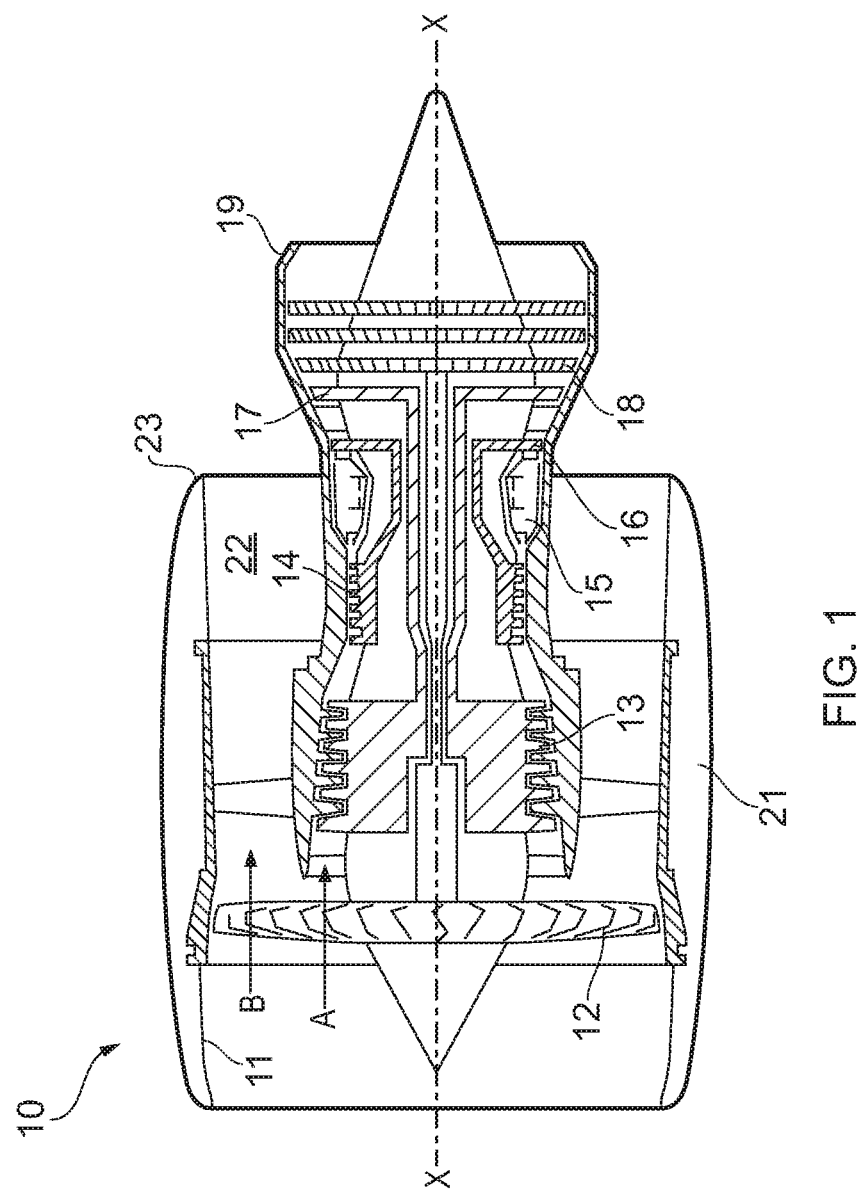
FIG. 1 shows a ducted fan gas turbine.
Figure 2:
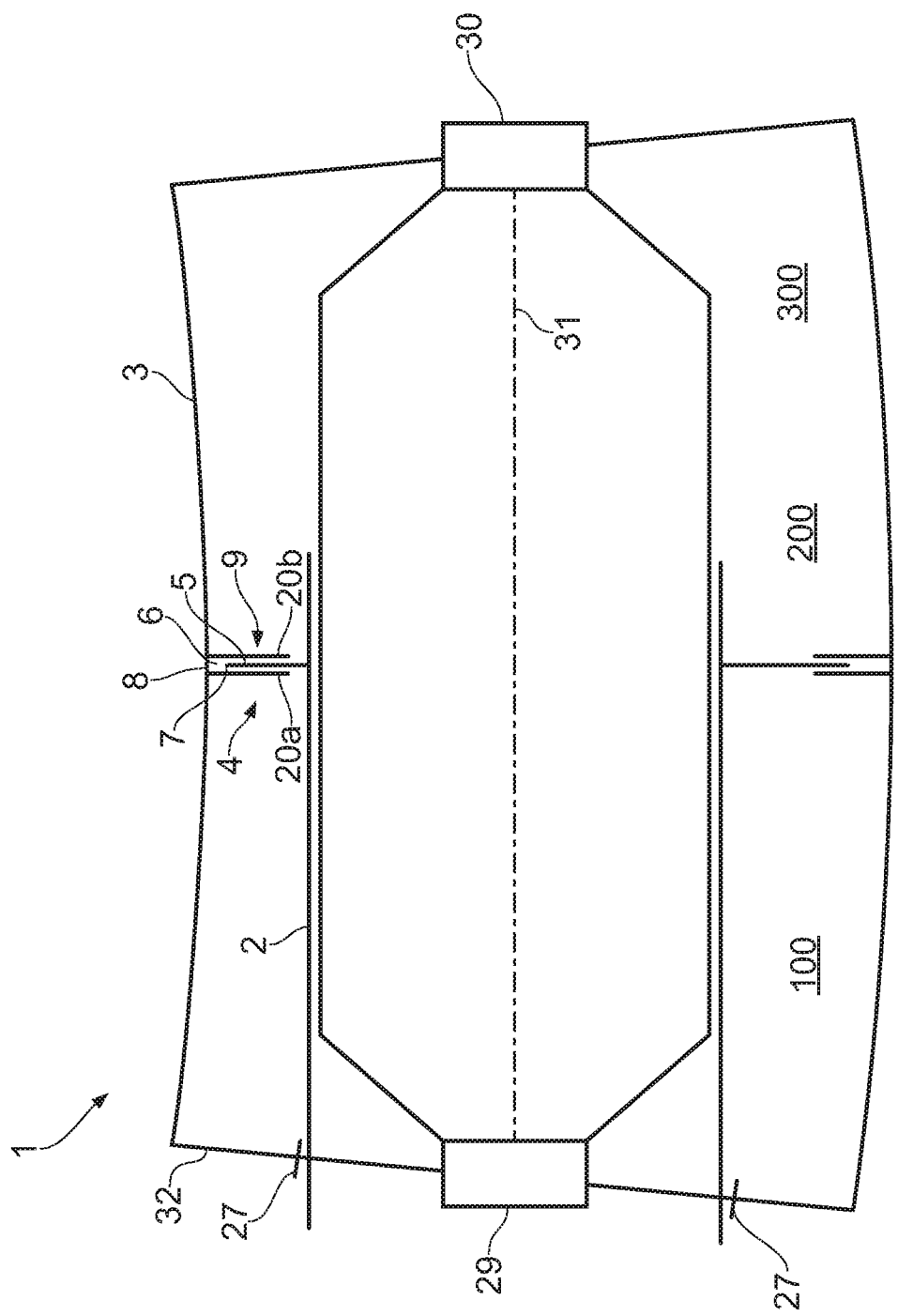
FIG. 2 shows a schematic representation of an axial cross-section through a casing assembly surrounding a high pressure compressor according to a first embodiment of the present invention.

As shown in FIG. 2, a casing assembly 1 for surrounding a high pressure compressor (100) in a gas turbine engine comprises a radially inner casing 2 and a radially outer casing 3.

The outer casing 3 extends the full length of the high pressure rotor which includes a high pressure compressor (100), a combustor (200) and a high pressure turbine (300). The rotor includes a shaft extending between an upstream (front) bearing 29 and a downstream (rear) bearing 30 along a rotor axis 31. To reduce the weight/cost of the casing assembly, the inner casing 2 only extends to enclose the compressor; it does not surround the combustor i.e. the downstream axial end of the inner casing 2 is upstream of the downstream axial end of the outer casing 3.

An axial mounting arrangement 4 between the inner casing 2 and the outer casing 3 comprises a radially outwards-directed annular flange 5 extending from the inner casing 2 and a circumferential groove 6 provided on said outer casing 2. The groove 6 receives the annular flange 5 and the annular flange 5 is radially slidable within the groove 6.

The axial clearance between the circumferential flange and the groove may be 0.05±0.05 mm i.e. the flange may be substantially axially restrained within the circumferential groove.

The annular flange 5/circumferential groove 6 is coated/lined with a wear-resistant coating such as tungsten carbide cobalt.

The radially outer end 7 of the annular flange 5 is spaced from the radially outer end 8 of the groove 6 to ensure that there is no radial contact between the flange 5 and the groove 6 as a result of distortion of the outer casing 3 by engine carcass loads.

The annular groove 6 is defined within a radially inwards-directed annular element 9 on the inner casing 2. The annular element 9 is defined by two annular radially outwards-directed plates 20a, 20b extending from the inner casing 2.

The annular element 9 depends from the outer casing 3 at a position where there is an axial plane where the outer casing 3 is parallel to the engine/rotor axis 31 during carcass bending. As can be seen in FIG. 2, this is the point of the change of direction of the deformation where there is a zero gradient i.e. the point along the deformed outer casing 3 where it is parallel to the rotor centreline 31. This ensures that the inner casing 2 remains concentric with the rotor.

The casing assembly further comprises a radial mounting arrangement 27 comprising a mounting surface 28 on the inner casing which is mounted and axially slidable on a corresponding mounting surface depending from a front bearing support structure 32 which connects the outer casing 3 to the front rotor bearing 29. The mounting surface(s) 28 are coated with a wear-resistant coating such as tungsten carbide cobalt.

The radial mounting arrangement 27 may further comprise an anti-rotation mechanism to prevent rotational motion of the inner casing as a result of aeroloads applied to the stator vanes in the high pressure compressor.

Figure 3:
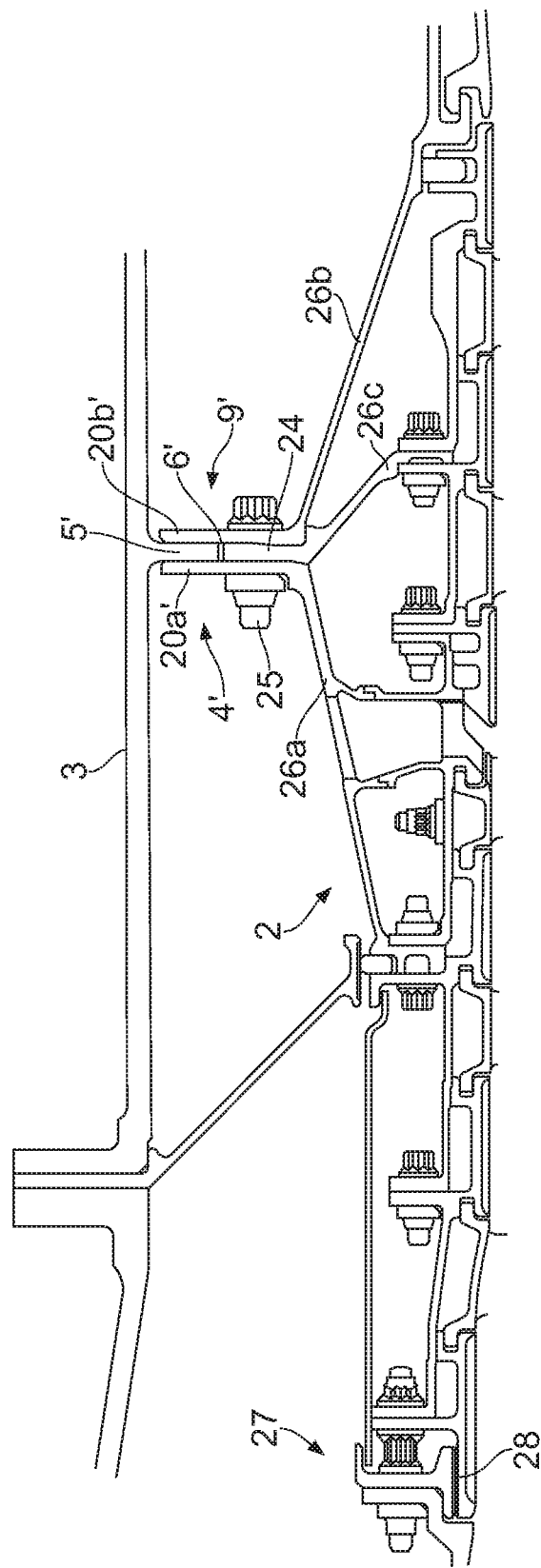
FIG. 3 shows an axial cross-section through a casing assembly according to a second embodiment of the present invention.

FIG. 3 shows a second embodiment which is similar to the first except in that the axial mounting arrangement 4' has a flange 5' depending radially inwards from the outer casing 3 (at a position where there is an axial plane where the outer casing 3 is parallel to the engine/rotor axis 31 during carcass bending) and a circumferential groove 6' provided on the inner casing 2.

The annular groove 6' is defined within a radially outwards-directed annular element 9' on the inner casing 2. The annular element 9' is defined by two annular radially outwards-directed plates 20a', 20b' extending from the inner casing 2. These annular plates are axially spaced by a spacer portion 24. The annular plates 20a', 20b' and spacer portion 24 are connected by an axially-extending bolt 25.

In this embodiment, the inner casing comprises a plurality of struts 26a, 26b extending radially outwards for supporting a respective annular plate 20a', 20b'. The struts 26a, 26b are equally and oppositely angled relative to the engine/rotor axis to form a triangular structure. A further strut 26c (which is also be angled relative to the engine/rotor axis) is provided to support the spacer portion 24.

In the embodiments shown in FIGS. 2 and 3, as the outer casing 3 distorts as a result of carcass loads, the flange 5, 5' moves radially within the groove 6, 6' without causing nay flexing of the inner casing 2. This allows the inner casing 2 to retain its circularity and thus its concentricity about the rotor axis 31.

Figure 4:
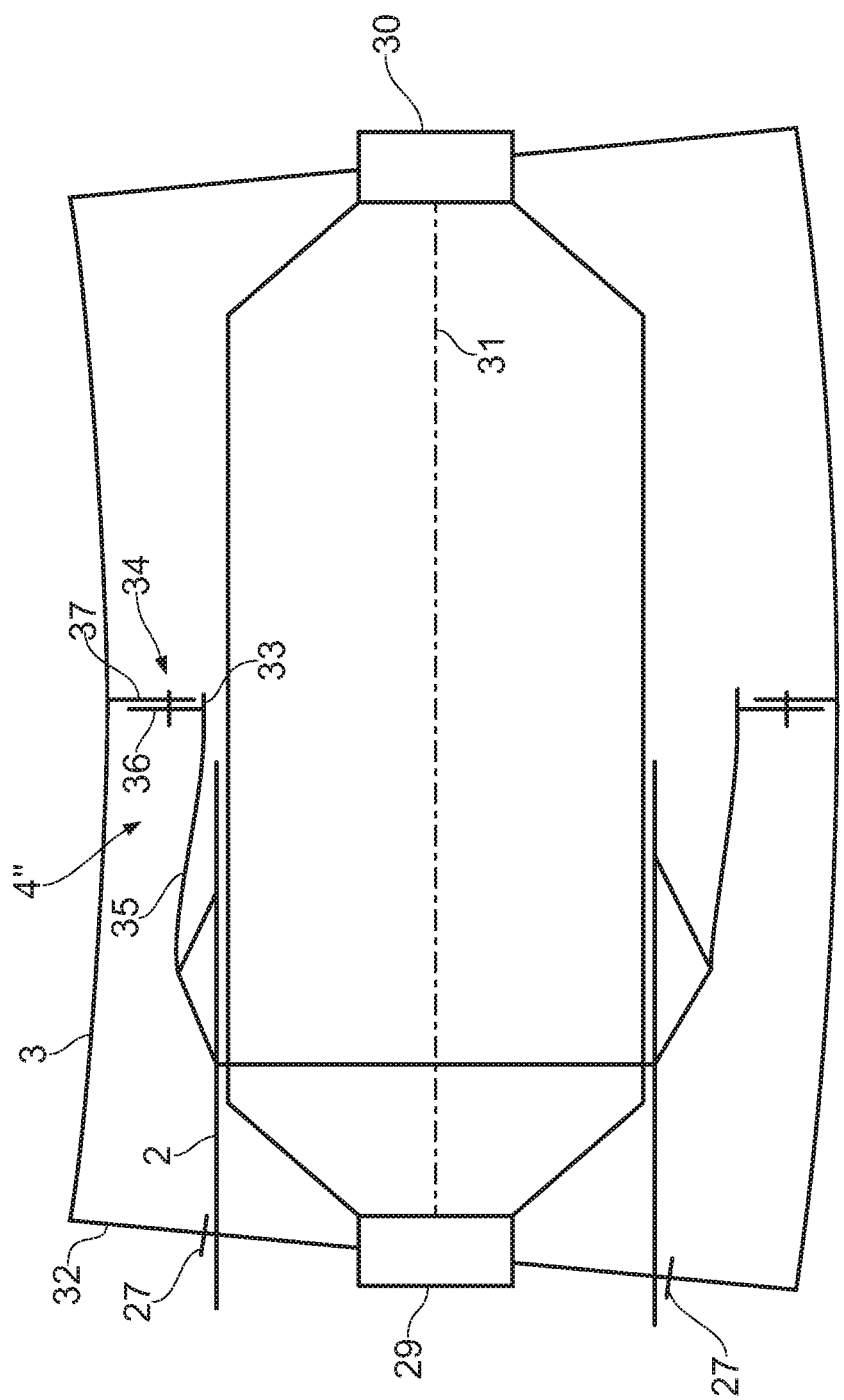
FIG. 4 shows a schematic representation of an axial cross-section through a casing assembly surrounding a high pressure compressor according to a third embodiment of the present invention

FIG. 4 shows a third embodiment of the present invention.

In this embodiment, the position of zero bending on the outer casing 3 is axially downstream of the downstream axial end 33 of the inner casing 2 (such that an optimally positioned flange/groove arrangement shown in FIGS. 2 and 3 cannot be formed), the axial mounting arrangement 4" may comprise a fixed connection 34 (axially and radially fixed) between the inner and outer casing 2, 3 and a radially flexible link element 35 axially fixed between the inner casing 2 and outer casing 3.

The flexible link element 35 is an apertured flange mounted the inner casing 2 having, at its downstream axial end, an inner casing connection element 36 which is a radially-outwards extending flange. This inner casing connection element 36 is bolted to an outer casing connection element 37 which is a radially inwards depending flange to secure the inner casing 2 and outer casing 3 in a fixed axial and radial relationship.

In the embodiment shown in FIG. 4, the radially flexible link element 35 flexes radially during movement of the outer casing 3 relative to the inner casing 2 i.e. it absorbs the radial deflection of the outer casing 3 without transferring it to the inner casing 2 thus allowing the inner casing 2 to retain its circularity and thus its concentricity about the rotor axis 31.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

We claim:

1. A casing assembly for a gas turbine engine comprising:
   a radially inner casing;
   a radially outer casing; and
   an axial mounting arrangement for mounting the inner casing and outer casing in a fixed axial relationship wherein the axial mounting arrangement allows radial movement of the outer casing relative to the inner casing, wherein:
   the outer casing has an axial extension portion which extends axially beyond the inner casing,
   the casing assembly comprises mounting arrangements for connecting the radially inner casing and the radially outer casing at two and only two axial positions, and
   the axial mounting arrangement comprises a fixed connection between the inner and outer casing and a radially flexible link element axially fixed between the inner casing and outer casing.

2. A casing assembly according to claim 1, wherein:
   the casing assembly is for a gas turbine engine having a compressor and a combustor; and
   the radially inner casing extends so as to surround the compressor but not the combustor.

3. A casing assembly according to claim 1, wherein the axial mounting arrangement is the most axially downstream mounting arrangement that connects the radially inner casing and the radially outer casing.

4. A casing assembly according to claim 1, wherein the axial mounting arrangement is provided at the more axially downstream position, and a radial mounting arrangement is provided at the more axially upstream position, the radial mounting arrangement being for mounting the inner casing and outer casing in a fixed radial relationship whilst allowing axial movement of the inner casing relative to the outer casing.

5. A casing assembly according to claim 4 wherein the radial mounting arrangement is provided at or proximal the upstream axial end of the inner casing.

6. A casing assembly according to claim 4 wherein the radial mounting arrangement comprises an anti-rotation mechanism to prevent rotation of the inner casing.

7. A casing assembly according to claim 1, wherein the axial mounting arrangement comprises either a radially inwards-directed annular flange depending from the outer casing and a circumferential groove provided on said inner casing or a radially outwards-directed annular flange extending from the inner casing and a circumferential groove provided on said outer casing, wherein the circumferential groove receives said annular flange and wherein the annular flange is radially slidable within said groove.

8. A casing assembly according to claim 7 wherein the axial mounting arrangement comprises a radially inwards-directed annular flange depending from the outer casing and a circumferential groove provided on said inner casing and the radially inner end of the annular flange is spaced from the radially inner end of the groove.

9. A casing assembly according to claim 7 wherein the axial mounting arrangement comprises a radially outwards-directed annular flange extending from the inner casing and a circumferential groove provided on said outer casing and the radially outer end of the annular flange is spaced from the radially outer end of the groove.

10. A casing assembly according to claim 7 wherein the flange or groove is provided on the outer casing at a position where there is an axial plane where the outer casing is parallel to the engine/rotor axis during bending of the outer casing.

11. A casing assembly according to claim 1, wherein the flexible link element is mounted on/forms part of the inner casing and has, at or proximal its downstream axial end, an inner casing connection element for forming the fixed connection with the outer casing.

12. A gas turbine engine comprising:
   a casing assembly according to claim 1;
   a high pressure compressor; and
   a high pressure turbine;
   wherein the radially inner casing and radially outer casing surrounds the high pressure compressor.

13. A gas turbine engine according to claim 12 further comprising a combustor wherein the inner casing does not surround the combustor.

14. A gas turbine engine according to claim 13, wherein the axial extension portion which extends axially beyond the inner casing surrounds the combustor.

* * * * *